April 25, 1961 R. B. JANNEY II 2,981,499
AIRCRAFT WITH AUXILIARY LAUNCHING AIRCRAFT
Filed Dec. 11, 1956 3 Sheets-Sheet 1
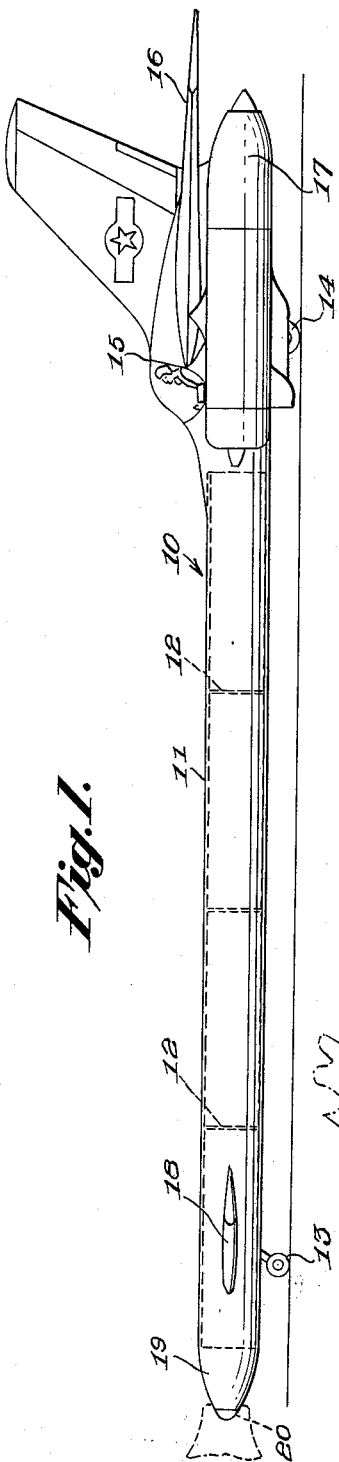
INVENTOR
Raymond B. Janney, II.
BY
Herbert M Birch
ATTORNEY

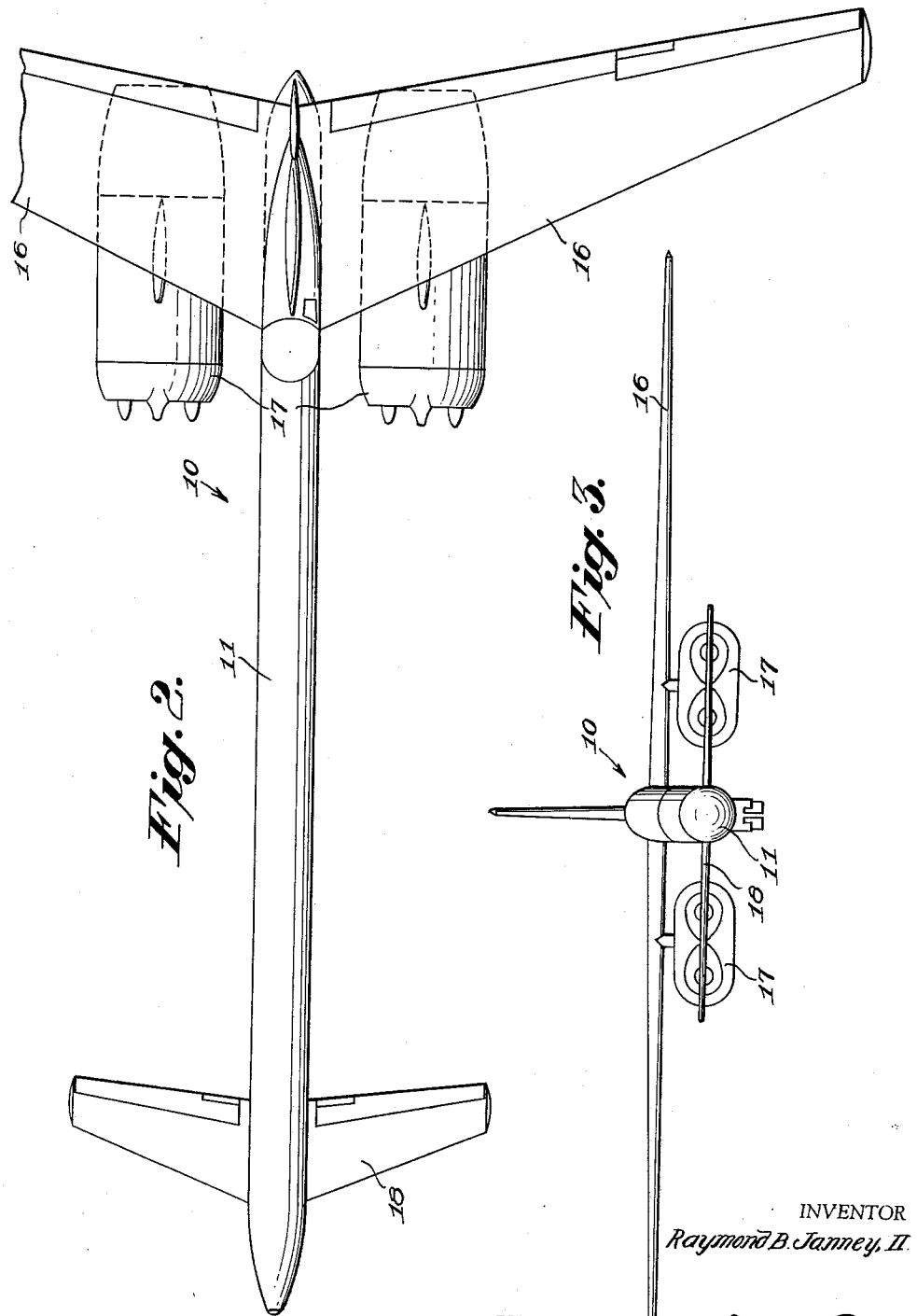

April 25, 1961  R. B. JANNEY II  2,981,499
AIRCRAFT WITH AUXILIARY LAUNCHING AIRCRAFT
Filed Dec. 11, 1956  3 Sheets-Sheet 3
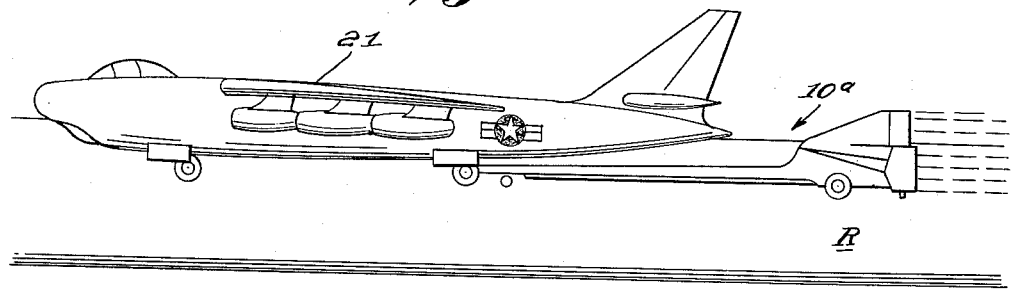
Fig. 7.
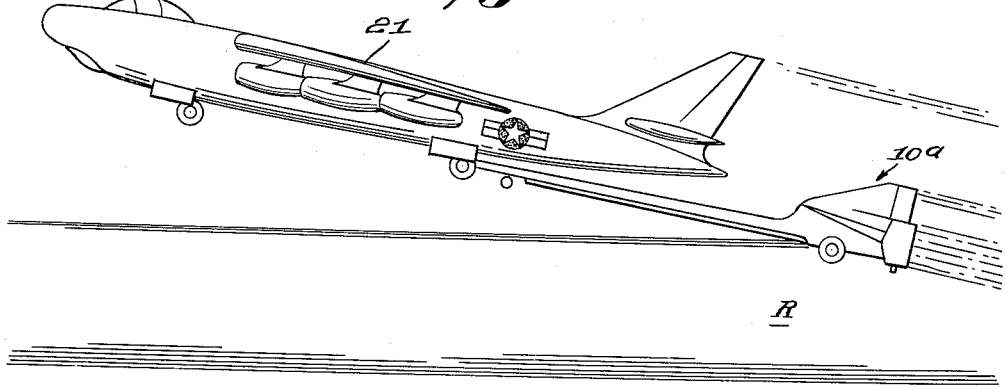
Fig. 8.
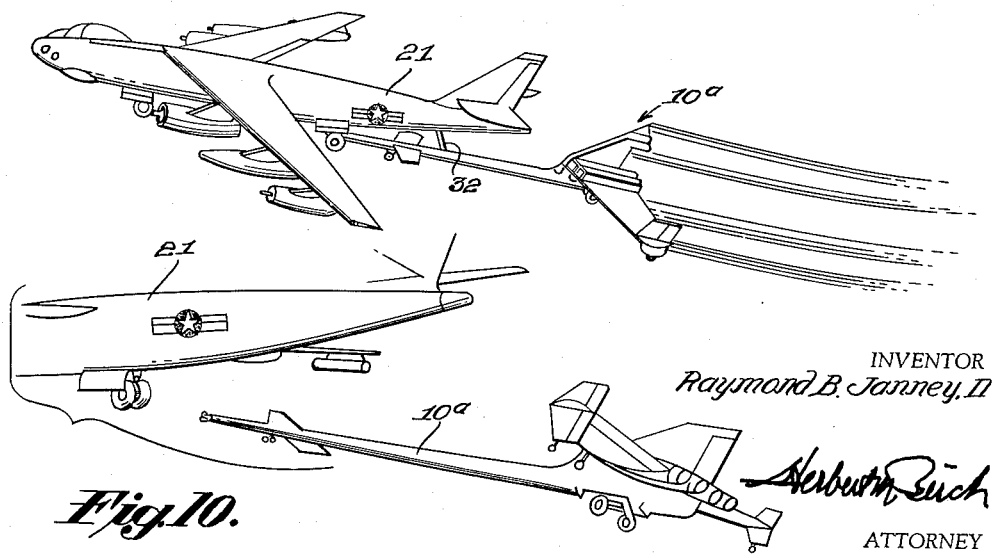
Fig. 9.
Fig. 10.
INVENTOR
Raymond B. Janney, II
ATTORNEY United States Patent Office 2,981,499
Patented Apr. 25, 1961

2,981,499

AIRCRAFT WITH AUXILIARY LAUNCHING AIRCRAFT

Raymond B. Janney II, Wilmington, Del., assignor to All American Engineering Company, Wilmington, Del., a corporation of Delaware Filed Dec. 11, 1956, Ser. No. 627,585

2 Claims. (Cl. 244—2)

This invention relates to an aerial catapult for assisting the take-off and climb of an aircraft and method of launching thereby.

The invention has as a primary object the provision of a flying pusher catapult having a relatively long body or fuselage for positioning with respect to the fuselage of an aircraft to be launched by pushing the same, wherein the free end of said catapult fuselage is adapted to forwardly engage an abutment disposed on the under side of the fuselage of an aircraft to be pushed, as for example between the wheels thereof, whereby the catapult has forward driving connection with the aircraft to be pushed and is rendered free thereof upon relative greater speed of the launched aircraft than that of the catapult.

A further object of the invention is the provision of an aircraft accelerating and air climbing jet powered pusher catapult, which embodies a relatively long body or fuselage of relatively small transverse dimensions, which is disposable beneath the fuselage of an aircraft and which has only a forward engagement therewith and wherein the body or fuselage of the pusher catapult is provided with main fuel tanks together with a hose leading from said body or fuselage for reception within the fuselage of the aircraft, whereby the latter is capable of being re-fueled while being assisted in its take off and climb to a desired altitude.

A still further object of the invention is the provision of an aerial pushing catapult of the above-noted character wherein the forward free end of the body thereof is provided with means which is automatically drivingly engaged with cooperating means on the aircraft upon forward movement of the catapult and which is automatically disengaged upon greater forward speed of the aircraft than that of the catapult.

A still further object of the invention is the provision of an aerial pushing catapult having a forwardly extending relatively long body or fuselage of relatively small transverse dimensions for projection beneath the fuselage of an aircraft from the rear end thereof together with cooperating drivingly engaged means between the forward end of the catapult body and the aircraft chassis, whereby the center line of catapult pushing energy is disposed substantially below the longitudinal center line of the aircraft chassis with resulting both horizontal and vertical components of force on the aircraft chassis for effecting combined horizontal and vertical elevating movement thereof.

Other objects and advantages of the invention will become apparent in the course of the following detailed description, taken in connection with the accompanying drawings, wherein:

Fig. 1 is a side elevational view of a highly streamlined form of the aerial catapult or pusher craft in accordance with a preferred structural embodiment thereof.

Fig. 2 is a broken top plan view of the pusher craft of Fig. 1.

Fig. 3 is a front elevational view of the pusher craft shown in Figs. 1 and 2.

Fig. 4 is a top plan view of a pusher craft of somewhat modified form and wherein a pushed craft is partially indicated in dotted lines above the pusher craft.

Fig. 5 is a side elevational view of the structure in Fig. 4 with the fore part of the pushed craft broken away.

Fig. 5–A is a fragmental vertical sectional view showing a pusher yoke on the chassis of an aircraft.

Fig. 6 is a fragmental horizontal sectional view showing the yoke engagement between the pusher craft and a pushed craft.

Fig. 7 is a side elevational view showing the pusher craft operatively engaged with a craft to be pushed at the take-off stage.

Fig. 8 is a view similar to Fig. 7 but in an airborne stage.

Fig. 9 is a perspective view showing a craft engaged by the pusher craft and having an assisted climb to desired altitude.

Fig. 10 is a fragmental perspective view showing the pusher catapult as breaking away from an aircraft after a pushing and accelerating action thereon.

Referring now in detail to the drawings, and first to Figures 1, 2 and 3 thereof, the pusher catapult 10 in its preferred structural form comprises an elongated cylindrical body or fuselage 11, which is so shaped and so proportioned for the purpose of extension under the fuselage of an aircraft to be launched by pushing and for retaining a plurality of main fuel tanks, for example, as indicated in dotted lines by 12 in Fig. 1. The number of tanks may of course be discretionary, but it is important that the internal space afforded by the cylindrical body be devoted to the retention of a maximum volume of fuel for the re-fueling of aircraft, while being pushed and boosted by the pusher catapult, which forms the subject matter of the present application.

The pusher catapult further comprises pairs of fore and aft wheels 13 and 14 respectively, the latter of which are disposed beneath a cockpit 15. The pusher catapult further comprises wings 16 beneath which are supported jet engines 17 and as is hereinafter referred to in connection with Figs. 4 and 5 reserve fuel retaining means are provided in the ends of the wings.

The catapult 10 further comprises forward stabilizer and control surfaces 18, and actually the pusher is a self-contained unit capable of flying in common with the usual jet aircraft, but it is particularly characterized in the long body or fuselage 11 having relatively small transverse dimensions, whereby the same is capable of extending beneath the fuselage of an aircraft to be accelerated, launched and boosted thereby.

As indicated in Fig. 1 the forward end of the fuselage 11 is reduced and rounded as at 19 and as indicated by dotted lines the aircraft to be pushed is provided with a coupling member, such as a socket 20 in which said rounded end 19 is freely received for a purpose as will hereinafter appear.

In Figs. 4, 5 and 6, a pusher catapult 10ª of somewhat modified form is shown in operative association with an aircraft 21 to be launched by pushing and which is indicated in dot-and-dash lines. The aircraft 21 may be of any desired form and is modified only to the extent of having a yoke or projection 22 (Fig. 5–A) secured to and depending from the fuselage thereof, and which yoke or projection is disposed intermediate the wheels 23 of the rear landing gear. The pusher catapult shown in Figs. 4, 5 and 6 is of the same general construction as the preferred embodiment of Figs. 1, 2 and 3. The body or chassis 11ª of the catapult 10ª is tapered toward its free end for maximum clearance of the fuselage of the aircraft to be pushed and the free end of the fuselage 11ª is provided with a reduced extension 24 in whose free end is an outwardly opening recess 25 for loosely receiving a ball 26 on the projection 22. The pusher catapult 10ª further includes rear wings 27 and forward stabilizing and controlling surfaces 28. The body or fuselage 11ª is provided with main fuel tanks 12ª (Fig. 5) and the ends of wings 27 are provided with suitable reserve fuel retaining means 30.

Jet engines similar to those of Figs. 1, 2 and 3 are operatively disposed beneath the wings 27 and adjustable reverse thrust means 31 are provided at the rear edge of the wings as indicated in Fig. 4. The body or fuselage of the pusher catapult is preferably provided with a refueling hose 32 whereby the pushed aircraft 21 may be refueled while same is being accelerated and boosted by the pusher catapult. The hose 32 may be mechanically ejected from the body 10ª containing the main fuel tanks and the free end thereof may be positioned by a person in the aircraft being pushed, suitable pump or pressure means of course being provided for forcing the fuel from the main tanks 12ª into the fuel reservoir in the craft being pushed.

In Figs. 7 to 10 inclusive are illustrated successive operations of the aircraft launching catapult 10ª. Thus, as shown in Fig. 7, the aircraft 21 is being accelerated and boosted by the pusher catapult 10ª, both of which are still on the runway R.

As indicated in Fig. 8 the aircraft 21 has taken off and the catapult 10ª is airborne while as shown in Fig. 9 the aircraft 21 is being assisted by the catapult 10ª for attainment of desired altitude.

According to Fig. 10 the catapult 10ª is breaking away from the aircraft 21 which has been aided in its take-off and gaining of altitude in a minimum interval of time as well as a minimum taxiing of the aircraft on the runway R.

From the above disclosure, it will be apparent that the improved pusher catapult is highly maneuverable and in preparation for pushing an aircraft on the runway R for the purpose of rapid take-off acceleration thereof, it is necessary only for the catapult to move forwardly in alignment with the longitudinal axis of the aircraft to be pushed, whereupon the front end of the catapult body or fuselage automatically engages the aircraft by the means above described. The catapult is preferably jet powered and thus capable of rapid acceleration whereby the aircraft, even though same be jet powered and capable of rapid acceleration, is boosted in its take-off and rapidly pushed as in Fig. 9 to gain desired altitude in a minimum period of time. After the aircraft has attained its desired altitude, as in Fig. 10, the speed of the catapult is checked whereby automatic disengagement of the catapult and aircraft is attained.

Furthermore, during the assisted climb of the aircraft as in Fig. 9, same may be re-fueled if necessary from the main fuel tanks in the catapult whereby the aircraft is capable of taking off with an overload of fuel and climbing at economical cruise power settings.

The improved pusher catapult is capable of short range flight only but with thrust weight ratio of 1 or more and by the provision of the reserve fuel tanks 30 same is capable of return to base even though the tanks 12 may have been emptied during an aircraft re-fueling operation.

While in Figs. 8 and 9 the aircraft 21 is shown at a relatively small angle to the runway R in the catapult assisted launching thereof, it should be apparent that with proper maneuvering of the pusher catapult 10, the aircraft may be pushed upwardly in a vertical direction.

While the invention has been disclosed in accordance with certain specific structural embodiments thereof, such are to be considered as illustrative only, and not restrictive, the scope of the invention being defined in the subjoined claims.

What is claimed and desired to be secured by U.S. Letters Patent is:

1. An aerial jet engine powered pusher catapult for accelerating and launching an aircraft from the ground into aerial flight, said aircraft having a pusher catapult engaging means on the under side of the fuselage and between the wheels of the rear landing gear for receiving forward and upward pushing force upon said aircraft during forward powered motion of said pusher catapult, said pusher catapult means comprising an elongated pole-like body of cylindrical form, said body having a reduced front end portion engageable with said pusher catapult engaging means on said aircraft, said elongated body being provided with a plurality of series connected fuel storage tanks, said body being provided with an aircraft refueling hose connected to dispense fuel from said tanks, said pusher catapult having pairs of fore and aft wheels, a cock-pit disposed at the rear end of said body above the aft wheels, wings at opposite sides of said cockpit, jet engines disposed beneath said wings, and forward stabilizer and control surfaces disposed adjacent the forward end of said body.

2. An aerial jet engine powered pusher catapult for accelerating and launching an aircraft from the ground into aerial flight, said aircraft having a pusher catapult engaging means on the under side of the fuselage and between the wheels of the rear landing gear for receiving forward and upward pushing force upon said aircraft during forward powered motion of said pusher catapult, said pusher catapult means comprising an elongated pole-like body of cylindrical form, said body having a reduced front end portion engageable with said pusher catapult engaging means on said aircraft, said pusher catapult having pairs of fore and aft wheels, a cock-pit disposed at the rear end of said body above the aft wheels, wings at opposite sides of said cock-pit, jet engines disposed beneath said wings, and forward stabilizer and control surfaces disposed adjacent the forward end of said body.

References Cited in the file of this patent

UNITED STATES PATENTS

| | | |
|---|---|---|
| 1,650,346 | Hall | Nov. 22, 1927 |
| 2,621,000 | Robert | Dec. 9, 1952 |
| 2,681,776 | Howard | June 22, 1954 |
| 2,845,237 | Doolittle | July 29, 1958 |
| 2,921,756 | Borden | Jan. 19, 1960 |

FOREIGN PATENTS

| | | |
|---|---|---|
| 292,826 | Great Britain | June 28, 1928 |
| 653,604 | France | July 22, 1930 |
| | (Add. to No. 37,253) | |
| 1,075,613 | France | Apr. 14, 1954 |